(12) United States Patent
Hotra et al.

(10) Patent No.: US 12,027,072 B2
(45) Date of Patent: Jul. 2, 2024

(54) VIRTUAL REALITY WITH VIRTUALIZATION IN TRAINERS AND TEST ENVIRONMENTS

(71) Applicant: The Boeing Company, Arlington, VA (US)

(72) Inventors: Jonathan N. Hotra, Maryland Heights, MO (US); Leighton J. Carr, Brisbane Airport (AU); Antony R. Hunt, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/299,389

(22) Filed: Apr. 12, 2023

(65) Prior Publication Data

US 2023/0245585 A1 Aug. 3, 2023

Related U.S. Application Data

(63) Continuation of application No. 16/195,117, filed on Nov. 19, 2018, now Pat. No. 11,688,297.

(51) Int. Cl.
*G09B 9/30* (2006.01)
*G06F 3/01* (2006.01)
*G09B 9/28* (2006.01)

(52) U.S. Cl.
CPC .............. *G09B 9/30* (2013.01); *G06F 3/016* (2013.01); *G09B 9/28* (2013.01)

(58) Field of Classification Search
None
See application file for complete search history.

(56) References Cited

U.S. PATENT DOCUMENTS

| | | | |
|---|---|---|---|
| 6,478,581 B1 | 11/2002 | Lin | |
| 10,924,679 B2* | 2/2021 | Lee | G06V 20/56 |
| 11,049,318 B2* | 6/2021 | Ikeuchi | G06Q 50/10 |
| 2015/0097860 A1 | 4/2015 | Alaniz et al. | |
| 2015/0097861 A1 | 4/2015 | Alaniz et al. | |
| 2015/0260474 A1 | 9/2015 | Rublowsky et al. | |
| 2016/0091894 A1 | 3/2016 | Zhang et al. | |
| 2016/0236088 A1 | 8/2016 | Li et al. | |
| 2017/0061813 A1 | 3/2017 | Tao et al. | |
| 2017/0148340 A1 | 5/2017 | Popa-Simil et al. | |

(Continued)

OTHER PUBLICATIONS

Communication Pursuant to Article 94(3) EPC, Application No. 19199207.2-1218, dated May 5, 2023, 7 Pages.

(Continued)

*Primary Examiner* — Toan H Vu
(74) *Attorney, Agent, or Firm* — Jordan IP Law, LLC

(57) ABSTRACT

Systems and methods are disclosed for virtual reality (VR) aircraft test and training environments that simultaneously leverage a high quality immersive environment engine and an operational flight program (OFP) running on a virtual flight management computer (FMC) by using a communication channels that couples the immersive VR environment engine with the virtual FMC. Existing investment in flight simulators, test environment core components, and any of navigation simulation, data link simulation, air traffic control simulation, and flight visualization modules can be advantageously employed to provide high-quality, realistic testing and training capability.

20 Claims, 6 Drawing Sheets

(56) References Cited

U.S. PATENT DOCUMENTS

| | | | | |
|---|---|---|---|---|
| 2018/0082477 | A1* | 3/2018 | Wilde | G06Q 50/14 |
| 2018/0373411 | A1* | 12/2018 | Wilde | G06F 16/954 |
| 2019/0063881 | A1 | 2/2019 | Abramov et al. | |
| 2019/0130783 | A1 | 5/2019 | Nissen et al. | |
| 2019/0244537 | A1 | 8/2019 | Liberatore et al. | |
| 2019/0355272 | A1* | 11/2019 | Nusbaum | G06F 3/011 |
| 2020/0066177 | A1 | 2/2020 | Li et al. | |
| 2020/0134705 | A1 | 4/2020 | Fahey et al. | |
| 2021/0049925 | A1 | 2/2021 | Robinson et al. | |
| 2021/0104099 | A1* | 4/2021 | Skelly | G06F 3/04815 |
| 2021/0381639 | A1* | 12/2021 | Howard | G02B 27/0176 |
| 2023/0267849 | A1* | 8/2023 | Gilchrist | G09B 9/28 434/36 |
| 2023/0333552 | A1* | 10/2023 | Duguid | G06T 17/05 |
| 2023/0360539 | A1* | 11/2023 | Al-Husseini | G08G 5/0052 |

OTHER PUBLICATIONS

Batista Da Silva et al., "Unmanned Aircraft System Coordination for Persistent Surveillance With Different Priorities," IEEE 26th International Symposium on Industrial Electronics (ISIE), Jun. 19, 2017, 6 Pages.

Extended European Search Report received for Application No. 19199207.2-1222, dated Feb. 5, 2020, 8 pages.

Aslandere, Turgay, et al., "A Generic Virtual Reality Flight Simulator," pp. 1-12, 2014.

Oberhauser, Matthias, et al., "Bridging the Gap Between Desktop Research and Full Flight Simulators for Human Factors Research," EPCE 2015, LNAI 9174, pp. 460-471, 2015.

Chinese Office Action, Application No. 201910987554.8, dated Jun. 28, 2023, 8 Pages.

\* cited by examiner

VIRTUAL REALITY WITH VIRTUALIZATION IN TRAINERS AND TEST ENVIRONMENTS

CROSS REFERENCE TO RELATED APPLICATIONS

This application claims the benefit of and priority to and is a Continuation of U.S. patent application Ser. No. 16/195,117 filed Nov. 19, 2018, the contents of which are incorporated by reference in its entirety.

BACKGROUND

As computer processing capabilities have increased over the years, it has become possible to create compelling augmented reality (AR), mixed reality (MR) and virtual reality (VR) platforms using low cost components. For example, AR, MR, and VR platforms (collectively VR) may often use game engines that provide an application programming interface (API) for graphics and user controls. However, these game engines have limited fidelity with respect to interactions with objects in the environment.

An example of the limited fidelity of a VR game engine is that a control panel in a virtual environment is often displayed as a polygon having a texture bitmapped onto the polygon so that it resembles a physical control panel, but yet does not provide a realistic interactive experience across a full range of potential inputs. In some situations, the texture bitmaps are static, or the simulated control panel has only limited functionality. Thus, a need exists for more realistic virtual reality with virtualization in trainers and test environments.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and examples disclosed herein are directed to virtual reality (VR) aircraft test and training environments that simultaneously leverage a high quality immersive environment engine (possibly a VR game engine) and an operational flight program (OFP) running on a virtual flight management computer (FMC) implemented on a virtual machine by using a communication channel that couples the immersive VR environment engine with the virtual FMC. Existing investment in flight simulators, test environment components, and any of navigation simulation, data link simulation, air traffic control simulation, and flight visualization modules can be advantageously employed to provide high quality, realistic testing and training capability.

Some aspects and examples disclosed herein are directed to a VR environment platform with an immersive VR environment engine having aircraft control and display units and providing an immersive VR environment of an aircraft; a virtual FMC implemented on a virtual machine running an OFP; and a communication channel coupling the immersive VR environment engine with the virtual FMC, the communication channel emulating FMC communication protocols to permit the immersive VR environment engine to run the virtual FMC.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
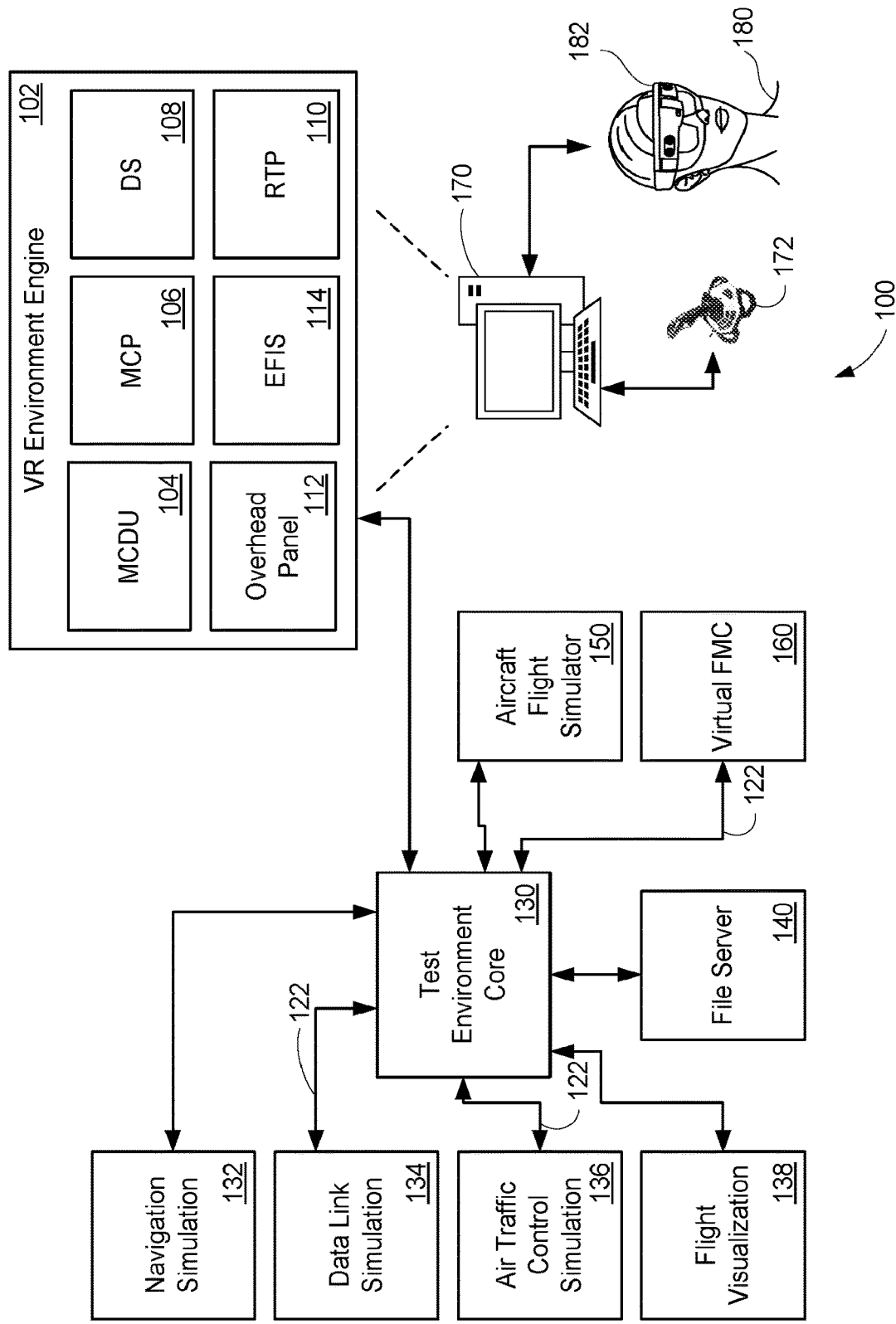
FIG. 1 is a block diagram illustrating a virtual reality (VR) environment platform for providing a test environment in accordance with aspects of the present disclosure.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In contrast with game engines, full-featured flight simulators have high fidelity models of hardware such as flight management computers (FMC) that communicate with a multipurpose computer display unit (MCDU), also known as a multipurpose control and display unit). In order to achieve the desired level of realism, the MCDU and FMCs are often simulated with intricate models or achieved through the use of actual flight hardware or proxy flight hardware. However, these options are costly to produce and are reliant on the skills of the developer. Meanwhile, existing low level training devices are model-based and sometime supplemented with physical structures that mock up the flight deck, flight deck, ground station, etc. When present, these physical mock ups are close to the layout of the actual device being trained for, but may not match the actual layout in most other cases. Additionally, the subsystem models do not have as much fidelity as virtual machines (VMs). A model is typically created by looking at the input/output for a subsystem and creating software to mimic the behavior of this subsystem from an input/output perspective.

VMs also generate input/output behavior, thus may appear to be similar, although for VMs, the behavior is driven by actual unmodified or minimally modified flight software binary executables, such as an operational flight program (OFP). For example, the FMC OFP can be run on the VM. VMs, that run the FMC's OFP, also referred to herein as a "virtual FMC," can provide considerably higher fidelity in a training environment, compared with simpler models and can also provide confidence that the behavior observed in the trainer will be the same as the physical device that the trainer is representing. It may then be possible to reduce the need for expensive full motion trainers (often costing in excess of $10M), by instead using a lower-cost compelling, immersive, high fidelity training platform.

Accordingly, examples of the present disclosure provide for virtual reality (VR) aircraft test and training environments that simultaneously leverage a high quality immersive environment engine (possibly a VR game engine) and an OFP running on a virtual FMC by using a communication channel that couples the immersive VR environment engine with the virtual FMC. Existing investment in flight simulators, test environment components, and any of navigation simulation, data link simulation, air traffic control simulation, and flight visualization modules can be advantageously employed to provide high quality, realistic testing and training capability.

Recent improvements in computer processing capabilities and advancements in VR and virtualization technologies are leveraged to create a new kind of training environment. A front end VR world provides an immersive and realistic visual experience for users, while the combinations of VR and real-time computer graphics allows users to perceive and interact with a virtual world in the same way they would with real devices. The integration of the VR world with a high fidelity back end consisting of models and VMs provides dynamic behavior that is nearly equivalent to physical hardware. The VMs allow for the actual unmodified or minimally modified flight software binaries and databases to be used in the training device, providing confidence that what is observed in the trainer will be the same as the actual aircraft. Additionally, testing environments are feasible with early creation of human-in-the-loop testing. Since the flight deck is created in the VR world, the flight deck can be prototyped and modified relatively inexpensively, and ultimately used as a design input for a physical flight deck. In general, when requirements are developed for the physical systems, models and virtual machines can be created and tested relatively quickly.

Various examples solve one or more problems related to the use of different protocols by different FMCs/MCDU's to communicate (e.g., ARINC 429, MIL-STD-1553, Ethernet). And, the messages can be packaged differently depending on the remote terminal (RT) and aircraft type. One or more examples disclosed herein use communication channels that allow for a uniform way to pack/unpack the messages. As a result, the communication channels can be incorporated in different processing engines, for example, a game engine, such as Unreal Engine 4. As such, with the one or more examples of the present disclosure, coding is performed once, and can be used on different FMCs with fewer changes, and more consistency. This reduces errors/debugging time and expense. Examples of various embodiments will now be described.

It should be appreciated that while the various examples described herein relate to an aircraft environment, the present disclosure can be implemented in other environments. For example, the herein described examples can be implemented in connection with any complex system that requires training, such as spacecraft, cars, boats, medical devices, etc. Thus, the various components described herein are operable in many other systems.

FIG. 1 is a block diagram illustrating an exemplary VR environment platform 100 for providing a test environment in accordance with aspects of the present disclosure. VR environment platform 100 includes an immersive VR environment engine 102 comprising aircraft control and display units and providing an immersive VR environment of an aircraft flight deck. For example, immersive VR environment engine 102 includes an MCDU 104, a mode control panel (MCP) 106, a display system (DS) 108, such as a MAX® display system (MDS) available from Rockwell Collins of Cedar Rapids, Iowa, a radio tuning panel (RTP) 110, an overhead panel 112, and an electronic flight instrument system (EFIS) 114. The MCDU 104 provides for navigation planning, and can display an electronic compass and flight information. The MCP 106 displays information such as airspeed and warnings for the flight crew. The DS 108 displays information such as the Primary Flight Display (PFD), Navigation Display (ND), and systems status. The overhead panel 112 provides interaction points, such as switches. In the VR environment, the overhead panel 112 can receive aircraft flight deck control inputs through virtual interaction points. The EFIS 114 is a (virtual version of a) flight deck instrument display system that displays flight data electronically rather than electromechanically. In some examples, the EFIS 114 is incorporated into the DS 108.

A virtualization system 170 comprises one or more computer storage devices having computer-executable instructions stored thereon for operating the VR environment platform 100, which, on execution by a computer, cause the computer to perform operations including operating the immersive VR environment engine 102. A physical interaction point 172, coupled to the virtualization system 170 and illustrated as a control stick, simulates an aircraft control and provides physical feedback to a user 180 of the VR environment platform 100. It should be understood that other physical interaction points can be provided, for example, rudder pedals that also simulate an aircraft control and provide physical feedback to the user 180. Also shown as coupled to the virtualization system 170 is a head mounted display (HMD) 182, worn by the user 180, for displaying a view of an immersive VR environment (as generated by the VR environment platform 100) to the user 180.

In the VR environment platform 100, as shown in FIG. 1, a test environment core component 130 interfaces with a flight simulator component 150, the immersive VR environment engine 102, and a virtual FMC 160. The test environment core component 130 further interfaces with a navigation simulation 132, a data link simulation 134, an air traffic control simulation 136, and a flight visualization 138, in order to provide additional realism for the operation of the aircraft flight simulator component 150. In other examples, other arrangements are possible with more or fewer components as necessary for the desired level of fidelity. In operation, the test environment core component 130 can be used, for example, to interject simulated failures and monitor subsystem operations. The test environment core component 130 is able to accomplish these tasks by the signaling among each of the flight simulator component 150, the virtual FMC 160, the navigation simulation 132, the data link simulation 134, the air traffic control simulation 136, and the flight visualization 138 passing through the test environment core component 130. Also shown as interfacing with the test environment core component 130 is a file server 140, for storing data used by and generated by operations of the VR environment platform 100.

In some examples, the flight simulator component 150 is the same binary executable that is used in high-end flight simulators. As such, the flight simulator component 150 can be interchangeable based on the configuration of the system. For example, the flight simulator component 150 can be configured to operate with or without a motion base (not shown), as needed for the desired level of fidelity. In the VR environment platform 100, the flight simulator component 150 interfaces with the virtual FMC 160 through the test environment core component 130, so that the test environment core component 130 can monitor the data traffic and inject simulated failures. The virtual FMC 160 runs an OFP, which, in some examples, is a copy of the same binary executable that is used in hardware FMCs on operational aircraft. The above-described arrangement provides a level of realism otherwise unattainable by typical game engines. The use of a communication channel, as described herein, also allows a game engine, in various examples, to interact with an OFP more easily than traditionally achievable by a game engine alone. The communication channel 122 couples the immersive VR environment engine 102 with the virtual FMC 160 through the test environment core component 130. That is, data traffic is routed through the test environment core component 130, which allows for example, test scripts and manual interaction to override nominal system behavior for testing purposes. The communication channel 122 emulates FMC communication protocols to permit the immersive VR environment engine 102 to interact with the virtual FMC 160 using the actual packed input/output (I/O) of the aircraft. In various examples, the communication channel 122 (with emulated FMC protocols) is also between the data link simulation 134 and the test environment core component 130, and the air traffic control simulation 136 and the test environment core component 130. The remaining connections illustrated in FIG. 1 do not use FMC communication protocols, and interconnect components that support the primary aircraft simulations and VMs. In some examples, the communication channel 122 is implemented using protocol buffers as known in the data communication technology. However, any suitable type of communication channel can be used.

The communication channel 122 supports any kind of packed input/output (I/O) to an aircraft avionics box, such as ARINC 429, ARINC 664, CAN bus, RS-485, MIL-STD-1553, MIL-STD-6016, ACARS, ATN, Ethernet, and so on. The I/O is transferred over the communication channel 122 using a form of interprocess communications if the link is virtual, e.g. sockets and UDP packets with aircraft I/O encapsulated in the packets. As another example, the packed I/O is transferred over physical I/O links by installing an ARINC 429 I/O card in a PC. The I/O is not stored in a file, but is dynamic information being shared between systems, just like in a real aircraft.

Figure 2:
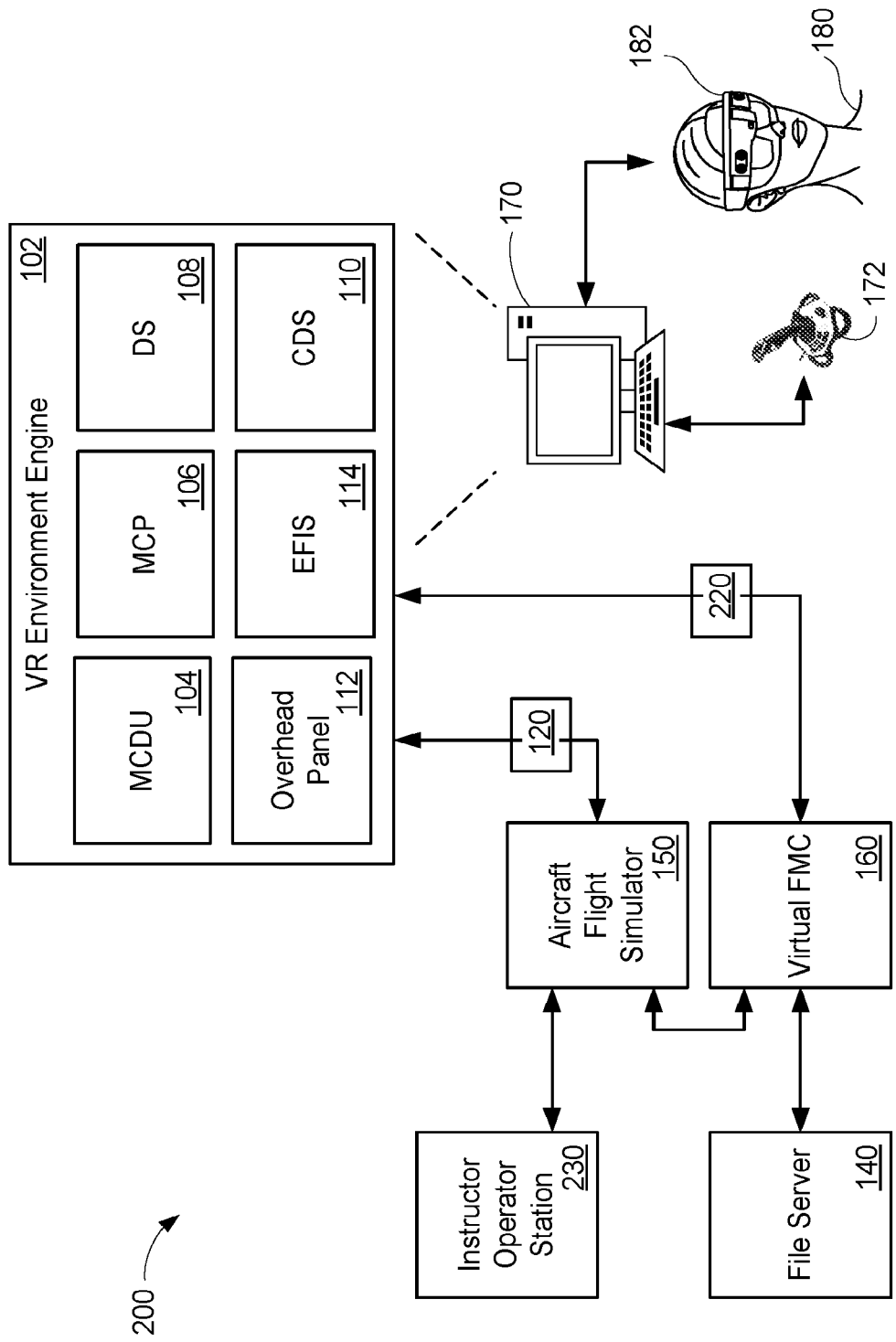
FIG. 2 is a block diagram illustrating a VR environment platform for providing a training environment in accordance with aspects of the present disclosure.

FIG. 2 is a block diagram illustrating an exemplary VR environment platform 200 for providing a training environment in accordance with aspects of the present disclosure. The VR environment platform 200 shares some components with the VR environment platform 100 of FIG. 1, although whereas the VR environment platform 100 is used for testing, the VR environment platform 200 is used for training, such as training flight crews. In the VR environment platform 200, the immersive VR environment engine 102 interfaces with the flight simulator component 150 and the virtual FMC 160, directly. Thus, a communication channel 220 couples the immersive VR environment engine 102 with the virtual FMC 160. The communication channel 220 emulates FMC communication protocols to permit the immersive VR environment engine 102 to interact with the virtual FMC 160. In some configuration of FIG. 2, the aircraft flight simulator 150 is located and connected to the other components similar to FIG. 1.

Additionally, the flight simulator component 150 and the virtual FMC 160 are coupled without the test environment core component 130 as an intermediary, although in some examples, a component similar to the test environment core component 130 can be used. The flight simulator component 150 interfaces with both the immersive VR environment engine 102 and the virtual FMC 160. The file server 140 is shown as coupled to the virtual FMC 160, although in some examples, the file server 140 can be coupled to the flight simulator component 150. Additionally, since the VR environment platform 200 is used for training, an instructor operator station component 230 interfaces with the flight simulator component 150. The instructor operator station component 230 permits an instructor to monitor and possibly participate in training activities conducted with the VR environment platform 200.

The VR environment platform 200 can be used as a flight management system (FMS) trainer. In some examples, a two-dimensional (2D) tablet-based application facilitates learning and practicing the operation of the MCDU 104, the MCP 106, and other displays (e.g., the DS 108) prior to and during various phases of flight. Students can learn and to practice FMS data entry (flight plan, etc.), as well as autoflight and flight path management as part of an instructor-led curriculum or for standalone self-guided training.

The VR environment platform 200 can be used as an interactive, fully-simulated virtual aircraft flight deck. Students will be able to learn and practice procedures in a fully immersive realistic virtual environment as part of an instructor-led curriculum or for standalone self-guided training. 3D interactive VR applications with high fidelity components as described in the VR environment platform 200 have the potential to greatly reduce the cost of training, as well as improve the learning outcome through immersive experiences. It can also enable self and distance learning, reducing and potentially eliminating the need to travel to an onsite training location.

Figure 4:
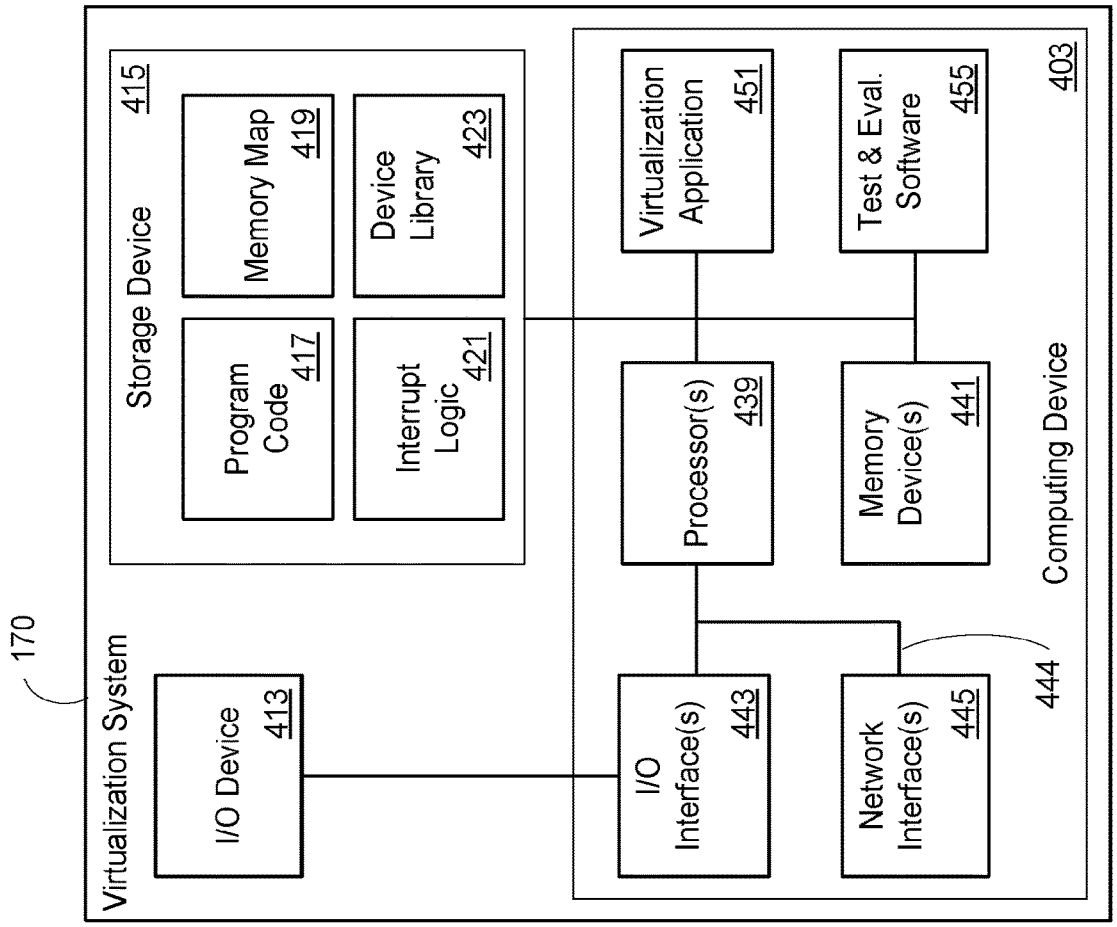
FIG. 4 is a block diagram illustrating a virtualization system in accordance with aspects of the present disclosure.
Figure 3:
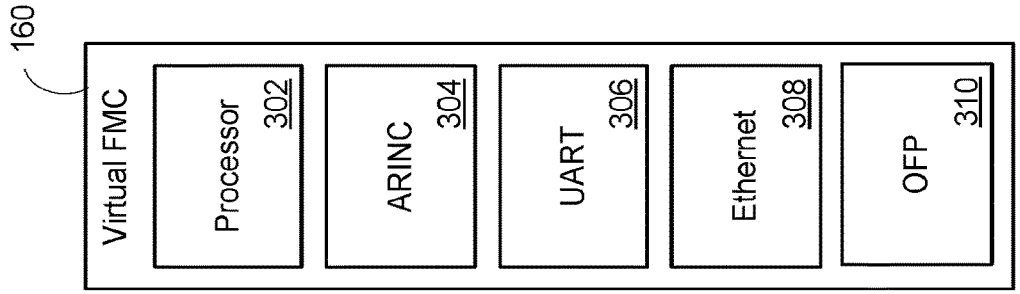
FIG. 3 is an illustration of a virtual flight management computer (FMC) implemented on a virtual machine in accordance with aspects of the present disclosure.

FIG. 3 is an illustration of the exemplary virtual FMC 160, which can be executed as a virtual machine (VM) on the virtualization system 170, shown in more detail in FIG. 4. As illustrated, the virtual FMC 160 comprises a processor 302, which can be a PowerPC processor, an ARINC bus 304 (e.g., ARINC 429 or ARINC 664), a universal asynchronous receiver-transmitter (UART) 306, an Ethernet module 308, and an OFP 310. The DITS 304 is the predominant avionics data bus used on many higher-end commercial and transport aircraft. It defines the physical and electrical interfaces of a two-wire data bus and a data protocol to support an aircraft's avionics local area network The UART 306 is a device for asynchronous serial communication in which the data format and transmission speeds are configurable.

Figure 7:
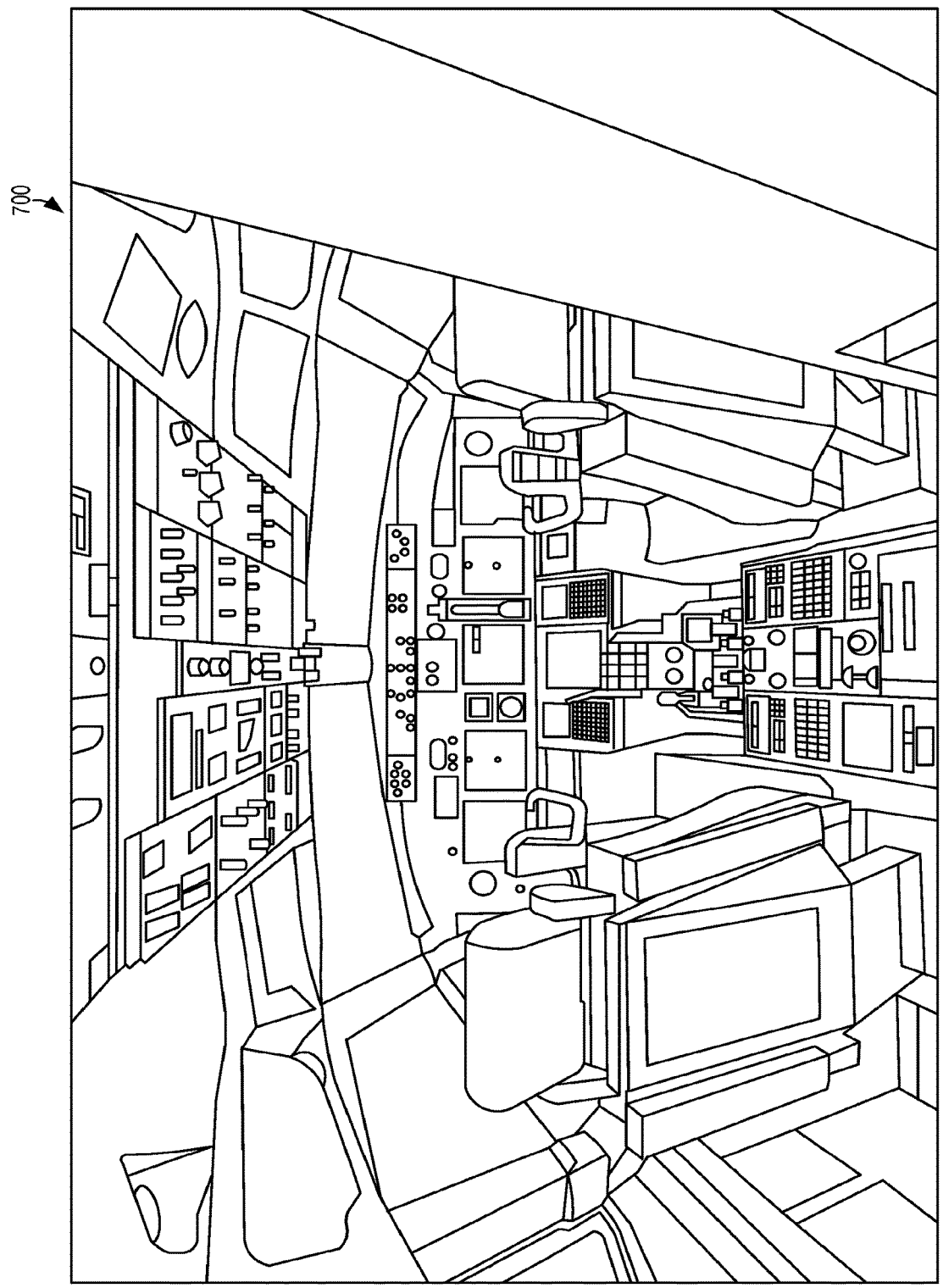
FIG. 7 is an illustration of an aircraft flight deck that can be virtualized in accordance with aspects of the present disclosure.

The OFP 310 is the embedded software that runs on an avionics device, namely, the hardware FMC. The physical platform that the test environment can be used to develop and that the trainer is used to train to operate, as described herein, emulates an aircraft flight deck 700 as shown in FIG. 7. That is, various examples emulate a physical system corresponding to the aircraft flight deck 700.

The OFP 310 contains software logic that perform functions necessary for the operation of the FMC. In the example of the hardware FMC, the OFP 310 performs the route planning, calculations, logic, input/out, and the like. The OFP 310 typically executes on top of an operating system software (e.g., an embedded real-time operating system) and functional components. The OFP 310 can be specifically tailored to the hardware of the avionics, the aircraft, and the aircraft type. The hardware FMC OFP communicates with other aircraft systems using Avionics buses, such as ARINC 429, examples of other aircraft systems include MCDU 104, MCP 106, DS 108, Overhead Panel 112, and EFIS 114. It should be appreciated that protocol buffers are not typically used for communication on an actual aircraft. Standard Ethernet for which the protocol buffers are designed lack the guaranteed message delivery required for aircraft system operation.

FIG. 4 is a block diagram illustrating additional detail for the exemplary virtualization system 170. The virtualization system 170 can be a computing system comprised of hardware and software that can emulate other devices. In implementations, the virtualization system 170 can be one or more general purpose computers, such as a server or a desktop computer that hosts one or more VMs that emulate physical hardware systems, such as a hardware FMC, as well as their hardware and software interfaces (e.g., peripherals, data links, interrupt behavior, and timing requirements). Additionally, a VM, such as the virtual FMC 160 execute an exact or substantially exact copy (e.g., an image) of the application software executed by the corresponding physical hardware system (for example the OFP 310). In implementations, the virtualization system 170 can include, e.g., a hypervisor or virtual machine monitor software. For example, the virtualization system 170 can use QUICK EMULATOR ("QEMU"), which is an open source software application that performs hardware virtualization. Thus, the virtual FMC 160 can be an emulation of a physical hardware FMC within the virtualization system 170.

The virtualization system 170 includes a computing device 403, an input/output (I/O) device 413, and a storage device 415. The I/O device 413 can include any device that enables an individual to interact with the computing device 403 (e.g., a user interface) and/or any device that enables the computing device 403 to communicate with one or more other computing devices using any type of communications link. The I/O device 413 can be, for example, a touchscreen display, pointer device, keyboard, etc.

The storage device 415 can comprise a computer-readable, non-volatile hardware storage device that stores information and program instructions. For example, the storage device 415 can be one or more flash drives and/or hard disk drives. In accordance with aspects of the present disclosure, the storage device 415 can store hardware system program code 417, one or more memory maps 419, interrupt logic 421, and a device library 423. The program code 417 can be application software of a physical hardware system (e.g., a physical FMC). In implementations, the program code 417 substantially mirrors that of the physical hardware system. The memory map 419 describes connections between components of the physical hardware systems from a memory interface perspective. For example, the memory map 419 can represent locations of information for memory registers of hardware components of the physical hardware system as an offset from a starting memory address. The interrupt logic 421 can be information describing the interrupt functionality of the physical hardware system, as detailed below. The device library 423 can be a repository of computer-readable information and instructions describing emulations of one or more physical hardware systems, which can be previously created and stored for future use.

In some examples, the computing device 403 includes one or more processors 439 (e.g., microprocessor, microchip, or application-specific integrated circuit), one or more memory devices 441 (e.g., RAM, read-only memory (ROM)), one or more I/O interfaces 443, and one or more network interface devices 445. The memory devices 441 can include a local memory (e.g., a random access memory and a cache memory) employed during execution of program instructions. Additionally, the computing device 403 includes at least one communication channel 444 (e.g., a data bus) by which it communicates with the I/O device 413 and the storage device 415. The processor 439 executes computer program instructions (e.g., an operating system and/or application programs), which can be stored in the memory device 441 and/or storage device 415.

The processor 439 can also execute computer program instructions of a virtualization application 451 (e.g., QEMU) and test and/or evaluation software 455. The virtualization application 451 can be the same or similar to that previously described. For example, the virtualization application 451 can include a hypervisor or VM monitor software. In accordance with aspects of the present disclosure, the virtualization application 451 can provide a VM (e.g., the virtual FMC 160) using the program code 417, the memory map 419, the interrupt logic 421, and/or the device library 423.

The training, test and/or evaluation software 455 can be an application or program including computer-readable instructions and information configured to train, test, evaluate, and/or validate software. For example, training, test and/or evaluation software 455 can execute test routines that verify program code of a hardware device behaves as expected in response to a predetermined scenario. Additionally, the training, test and evaluation software 455 can execute cybersecurity routines that test attack vectors of malicious software. For example, the training, test and/or evaluation software 455 can record complete state (registers, memory, hardware states, etc.) of a virtual machine as instructions execute to allow observation and analysis of a compromised system. The training, test and/or evaluation software 455 can be used to provide a trainer for users of the VR environment platform 200 (e.g. flight crew or maintenance trainers).

It is noted that the computing device 403 is representative of various possible equivalent-computing devices that can perform the processes described herein. To this extent, in embodiments, the functionality provided by the computing device 403 can be any combination of general and/or specific purpose hardware and/or computer program instructions. In the disclosed embodiments, the program instructions and hardware can be created using standard programming and engineering techniques, respectively.

Figure 5:
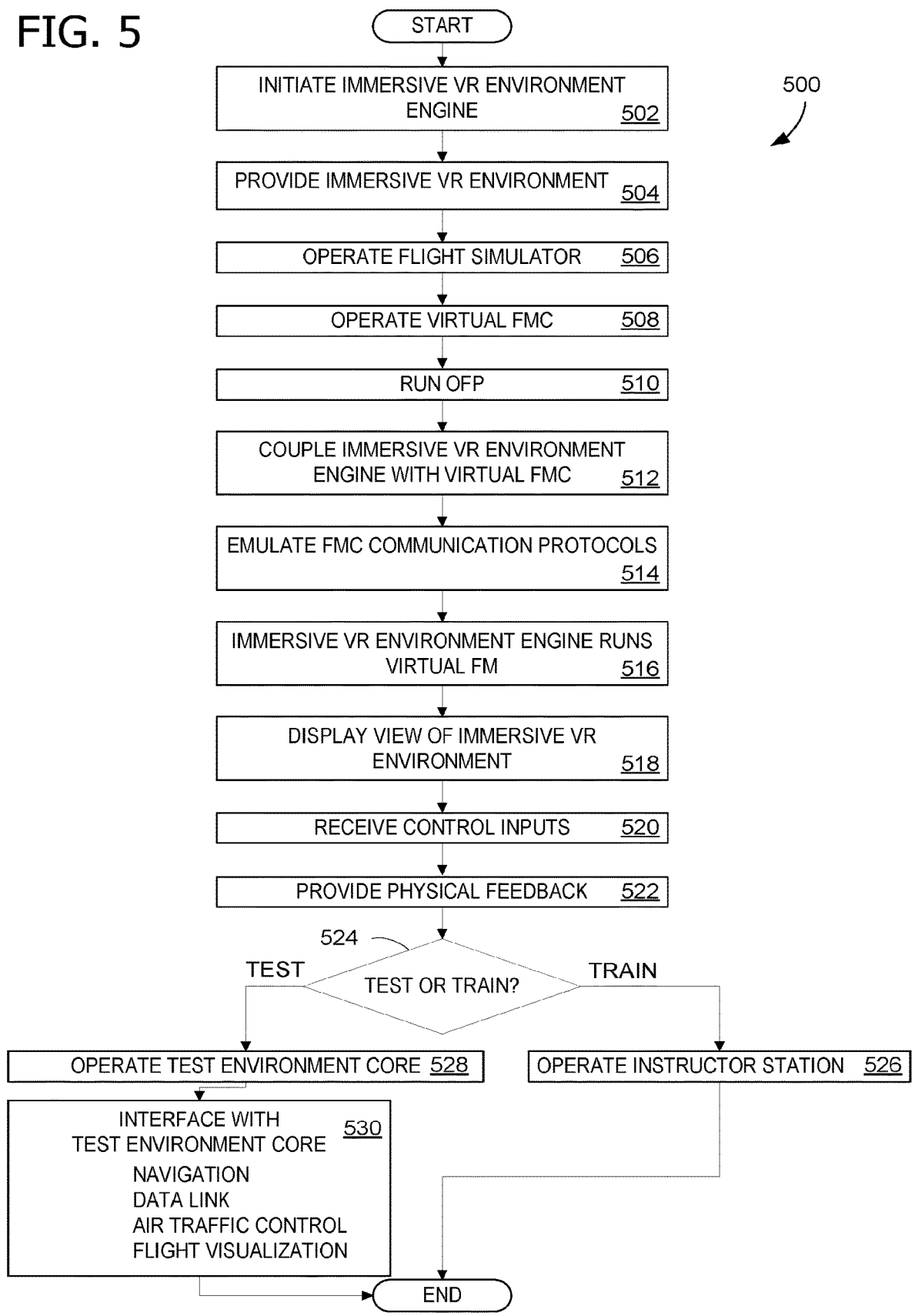
FIG. 5 is a flow diagram illustrating a process of providing virtual reality with virtualization in trainers and test environments in accordance with aspects of the present disclosure.

FIG. 5 is a flow diagram 500 illustrating an exemplary process of providing an immersive VR environment with virtualization in trainers and test environments. Operation 502 includes initiating the immersive VR environment engine 102 comprising aircraft control and display units (e.g., the MCDU 104, the MCP 106, the DS 108, the overhead panel 112, and the electronic flight instrument system (EFIS) 114 and operation 504 includes providing an immersive VR environment of an aircraft. In some examples, a startup procedure for the system includes initiating a startup on the test environment core GUI (e.g., a user clicking "Startup"). However, other startup procedures in the VR environment technology can be used.

Operation 506 includes operating the flight simulator component 150 (configured with XML and JSON files) interfacing with the immersive VR environment engine 102 and the virtual FMC 160. Operation 508 includes operating the virtual FMC 160 running the OFP 310. The OFP 310 runs within the virtual FMC 160 on the virtualization system 170 in operation 510. The configuration of the VM in various examples operates similar to physical aircraft hardware. For example, the flight software OFP is configured with operation program configuration (OPC) databases, and airline modifiable information (AMI), which are XML based in some configurations. It should be noted that in various examples, the communication channels are defined during design and implemented as compiled code.

Operation 512 includes coupling the immersive VR environment engine 102 with the virtual FMC 160 with a communication channels (e.g., one or more of the communication channels 122 and 220). Operation 514 includes the communication channels (e.g., one or more of the communication channels 122 and 220) emulating FMC communication protocols to permit the immersive VR environment engine 102 to run in parallel to and communicates with the virtual FMC 160 in operation 516. Operation 518 includes displaying a view of the immersive VR environment. The display can be 2D or 3D, and can be on any suitable display device, such as a screen or an HMD, such as the HMD 182. Operation 520 includes receiving aircraft cockpit control inputs for the immersive VR environment through virtual interaction points (e.g., the MCDU 104, the MCP 106, the DS 108, the RTP 110, the overhead panel 112, and the EFIS 114, which are simulations within the immersive VR environment engine 102). Operation 522 includes providing physical feedback to a user of the VR environment platform through a physical interaction point simulating an aircraft control (e.g., the physical interaction point 172). For example, a physical manifestation of a control stick and rudder pedals can provide mechanical resistance or move as controlled by flight simulation activities.

Decision 524 indicates two options: a test environment, such as the VR environment platform 100 of FIG. 1, or a training environment, such as the VR environment platform 200 of FIG. 2. If a training environment, then operation 526 includes operating the instructor operator station component 230 interfacing with the flight simulator component 150. If a test environment, then operation 528 includes operating the test environment core component 130 interfacing with the flight simulator component 150, the immersive VR environment engine 102, and the virtual FMC 160. In operation 530, at least one of navigation simulation 132, the data link simulation 134, the air traffic control simulation 136, and the flight visualization 138 interfacing with the test environment core component 130.

Figure 6A:
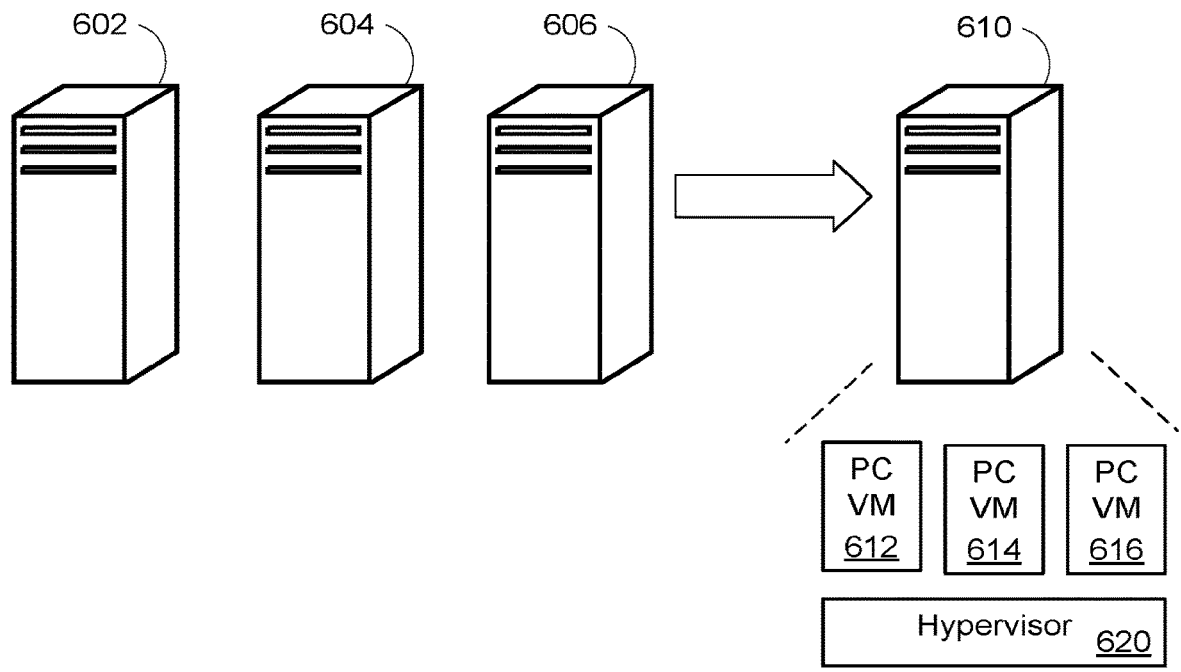
FIG. 6A is an illustration of server consolidation in accordance with aspects of the present disclosure.

FIG. 6A is an illustration of server consolidation in accordance with aspects of the present disclosure. In FIG. 6A, each of servers 602, 604, and 606 operates as one of VMs 612, 614, and 616, respectively, on a single host server 610. Although three servers (602, 604, and 606) are illustrated, it should be understood that a different number of servers can be combined as VMs on a host server. A hypervisor 620 manages the execution of the VMs 612, 614, and 616 as guest machines. Operation in this manner permits the various components of the VR environment platform 100 of FIG. 1 and the VR environment platform 200 of FIG. 2 to operate on a single machine, for example, the single host server 610.

Figure 6B:
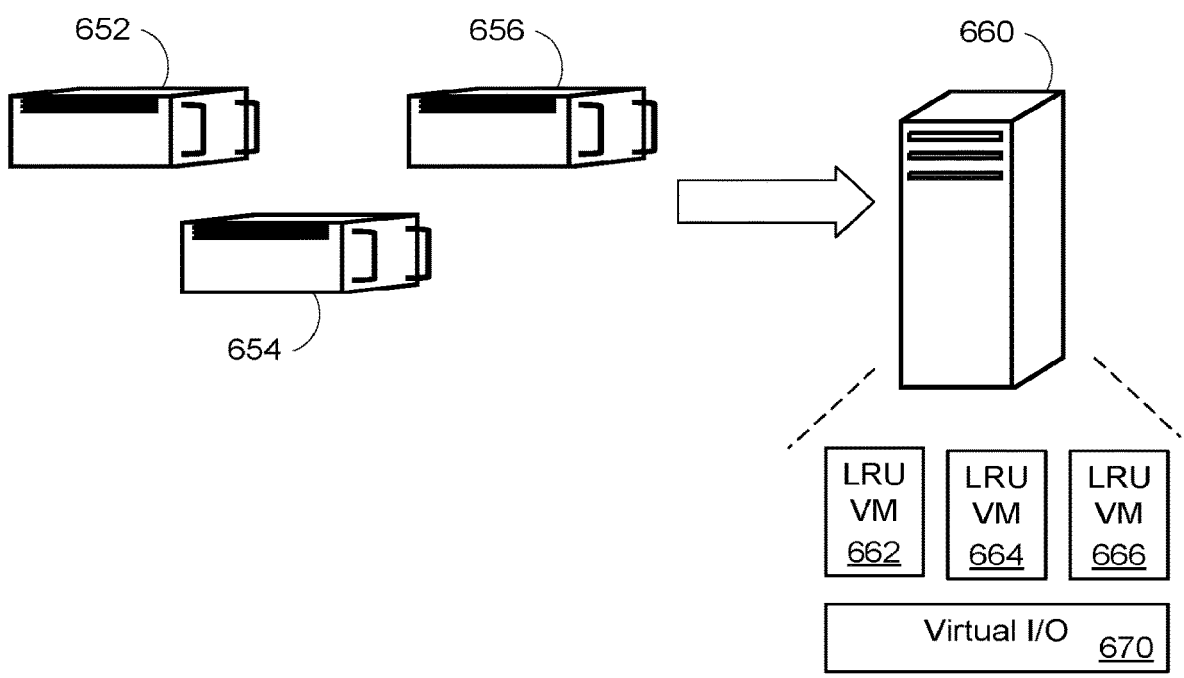
FIG. 6B is an illustration of virtualization in accordance with aspects of the present disclosure.

FIG. 6B is another illustration of virtualization in accordance with aspects of the present disclosure. In FIG. 6B, line replaceable units (LRUs) 652, 654, and 656 represent specialized hardware units, such as hardware units that can be used in an aircraft. Each of LRUs 652, 654, and 656 is simulated using one of VMs 662, 664, and 666, respectively, on a single host server 660. Although three LRUs (652, 654, and 656) are illustrated, it should be understood that a different number of LRUs can be combined as VMs on a host server. A virtual I/O component 670 manages the messaging and data flow among each of the VMs 662, 664, and 666 as guest machines. Operation in this manner permits the various components an aircraft to be virtualized to use with the VR environment platform 100 of FIG. 1 and the VR environment platform 200 of FIG. 2.

An exemplary system provided herein is a VR environment platform. The VR environment platform comprises: an immersive VR environment engine comprising aircraft control and display units and providing an immersive VR environment of an aircraft; a virtual FMC running an OFP; and a communication channel coupling the immersive VR environment engine with the virtual FMC, the communication channel emulating FMC communication protocols to permit the immersive VR environment engine to run the virtual FMC.

An exemplary method provided herein is a method of operating an immersive VR environment. The method comprises: operating an immersive VR environment engine comprising aircraft control and display units and providing an immersive VR environment of an aircraft; operating a virtual FMC running an OFP; and coupling the immersive VR environment engine with the virtual FMC with a communication channel, the communication channel emulating FMC communication protocols to permit the immersive VR environment engine to run the virtual FMC.

An exemplary system provided herein includes one or more computer storage devices having computer-executable instructions stored thereon for operating an immersive VR environment platform, which, on execution by a computer, cause the computer to perform operations comprising: operating an immersive VR environment engine comprising aircraft control and display units and providing an immersive VR environment of an aircraft; displaying a view of an immersive VR environment on an HMD; receiving aircraft flight deck control inputs for the immersive VR environment through virtual interaction points; operating a virtual flight management computer (FMC) running an operational flight program (OFP); providing physical feedback (or receiving a physical input) to a user of the VR environment platform through a physical interaction point simulating an aircraft control; operating a flight simulator component interfacing with the immersive VR environment engine and the virtual FMC, and coupling the immersive VR environment engine with the virtual FMC with a protocol buffer, the communication channel emulating FMC communication protocols to permit the immersive VR environment engine to run the virtual FMC.

Alternatively or in addition to the other examples described herein, the foregoing exemplary system and methods include any combination of the following: an HMD for displaying a view of an immersive VR environment; displaying a view of an immersive VR environment on an HMD; virtual interaction points providing aircraft flight deck control inputs for the immersive VR environment; receiving aircraft flight deck control inputs for the immersive VR environment through virtual interaction points; a physical interaction point simulating an aircraft control and providing physical feedback to a user of the VR environment platform; providing physical feedback (or receiving a physical input) to a user of the VR environment platform through a physical interaction point simulating an aircraft control; a flight simulator component interfacing with the immersive VR environment engine and the virtual FMC; operating a flight simulator component interfacing with the immersive VR environment engine and the virtual FMC; an instructor operator station component interfacing with the flight simulator component; operating an instructor operator station component interfacing with the flight simulator component; a test environment core component interfacing with the flight simulator component, the immersive VR environment engine, and the virtual FMC; operating a test environment core component interfacing with the flight simulator component, the immersive VR environment engine, and the virtual FMC; at least one component interfacing with the test environment core component and selected from the list consisting of: navigation simulation, data link simulation, air traffic control simulation, and flight visualization; and interfacing with the test environment core component, at least one component selected from the list consisting of: navigation simulation, data link simulation, air traffic control simulation, and flight visualization.

The examples illustrated and described herein, as well as examples not specifically described herein but within the scope of aspects of the disclosure, constitute exemplary means for providing a VR environment. The order of execution or performance of the operations in examples of the disclosure illustrated and described herein is not essential, and can be performed in different sequential manners in various examples. For example, it is contemplated that executing or performing a particular operation before, contemporaneously with, or after another operation is within the scope of aspects of the disclosure.

The following paragraphs describe further aspects of the disclosure:

A1. A VR environment platform comprising:
an immersive VR environment engine comprising aircraft control and display units and providing an immersive VR environment of an aircraft;
a virtual FMC running an OFP; and
a communication channel coupling the immersive VR environment engine with the virtual FMC, the communication channel emulating FMC communication protocols to permit the immersive VR environment engine to run the virtual FMC.

A2. The VR environment platform of A1 further comprising:
an HMD for displaying a view of an immersive VR environment.

A3. The VR environment platform of A1 further comprising:
virtual interaction points providing aircraft flight deck control inputs for the immersive VR environment.

A4. The VR environment platform of A1 further comprising:
a physical interaction point simulating an aircraft control and providing physical feedback to a user, or receiving a physical input from the user, of the VR environment platform.

A5. The VR environment platform of A1 further comprising:
a flight simulator component interfacing with the immersive VR environment engine and the virtual FMC.

A6. The VR environment platform of A5 further comprising:
an instructor operator station component interfacing with the flight simulator component.

A7. The VR environment platform of A5 further comprising:
a test environment core component interfacing with the flight simulator component, the immersive VR environment engine, and the virtual FMC.

A8. The VR environment platform of A7 further comprising:
at least one component interfacing with the test environment core component and selected from the list comprising at least of:
navigation simulation, data link simulation, air traffic control simulation, and flight visualization.

A9. A method of operating an immersive VR environment platform, the method comprising:
operating an immersive VR environment engine comprising aircraft control and display units and providing an immersive VR environment of an aircraft;
operating a virtual FMC running an OFP; and
coupling the immersive VR environment engine with the virtual FMC with a communication channel, the communication channel emulating FMC communication protocols to permit the immersive VR environment engine to run the virtual FMC.

A10. The method of A9 further comprising:
displaying a view of an immersive VR environment on an HMD.

A11. The method of A9 further comprising:
receiving aircraft flight deck control inputs for the immersive VR environment through virtual interaction points.

A12. The method of A9 further comprising:
providing physical feedback to a user, or receiving a physical input from the user, of the VR environment platform through a physical interaction point simulating an aircraft control.

A13. The method of A9 further comprising:
operating a flight simulator component interfacing with the immersive VR environment engine and the virtual FMC.

A14. The method of A13 further comprising:
operating an instructor operator station component interfacing with the flight simulator component.

A15. The method of A13 further comprising:
operating a test environment component interfacing with the flight simulator component, the immersive VR environment engine, and the virtual FMC.

A16. The method of A15 further comprising:
interfacing with the test environment component, at least one component selected from the list comprising at least of:
navigation simulation, data link simulation, air traffic control simulation, and flight visualization.

A17. One or more computer storage devices having computer-executable instructions stored thereon for operating an immersive virtual reality (VR) environment platform, which, on execution by a computer, cause the computer to perform operations comprising:
operating an immersive VR environment engine comprising aircraft control and display units and providing an immersive VR environment of an aircraft;
displaying a view of an immersive VR environment on an HMD;
receiving aircraft flight deck control inputs for the immersive VR environment through virtual interaction points;
operating a virtual FMC running an OFP;
providing physical feedback to a user of the VR environment platform through a physical interaction point simulating an aircraft control;
operating a flight simulator component interfacing with the immersive VR environment engine and the virtual FMC, and
coupling the immersive VR environment engine with the virtual FMC with a communication channel, the communication channel emulating FMC communication protocols to permit the immersive VR environment engine to run the virtual FMC.

A18. The one or more computer storage devices of A17 wherein the operations further comprise:
operating an instructor operator station component interfacing with the flight simulator component.

A19. The one or more computer storage devices of A17 wherein the operations further comprise:
operating a test environment core component interfacing with the flight simulator component, the immersive VR environment engine, and the virtual FMC.

A20. The one or more computer storage devices of A19 wherein the operations further comprise:
interfacing with the SITE component, at least one component selected from the list comprising at least of: navigation simulation, data link simulation, air traffic control simulation, and flight visualization.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It will be understood that the benefits and advantages described above can relate to one embodiment or can relate to several embodiments. The embodiments are not limited to those that solve any or all of the stated problems or those that have any or all of the stated benefits and advantages. The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps) is within the scope of aspects of the disclosure.

What is claimed is:

1. A virtual reality (VR) environment platform comprising:
one or more virtual machines (VMs);
a host server, wherein each of the one or more VMs are operable on the host server to emulate other systems;
a virtualization system operable on one of the one or more VMs, the virtualization system having a hardware device including one or more computer storage devices including computer-executable instructions stored thereon for operating the VR environment platform, which, on execution by the hardware device, cause the device to:
provide an immersive VR environment of an aircraft;
run, via a virtual flight management computer (FMC), an operational flight program (OFP); and
couple the immersive VR environment with the virtual FMC to permit the immersive VR environment to interact with the virtual FMC using actual packed input/output (I/O) of the aircraft.

2. The VR environment platform of claim 1, wherein the immersive VR environment and the virtual FMC are to be coupled via a protocol buffer.

3. The VR environment platform of claim 1, further comprising:
simulating one or more line replaceable units (LRUs) that represent specialized hardware units used in an aircraft, wherein each of the LRUs is to be simulated via a different one of the one or more VMs.

4. The VR environment platform of claim 3, wherein simulating the one or more LRUs is to permit other components of an aircraft to be virtualized to be used with the VR environment platform.

5. The VR environment platform of claim 1, further comprising:
a head mounted display (HMD) for displaying a view of an immersive VR environment.

6. The VR environment platform of claim 1, further comprising:
virtual interaction points providing aircraft flight deck control inputs for the immersive VR environment.

7. The VR environment platform of claim 1, further comprising:
a physical interaction point simulating an aircraft control and providing physical feedback to a user of the VR environment platform.

8. The VR environment platform of claim 1, further comprising:
a flight simulator component interfacing with the immersive VR environment engine and the virtual FMC.

9. A method of operating an immersive virtual reality (VR) environment platform, the method comprising:
provide an immersive VR environment of an aircraft;
run, via a virtual flight management computer (FMC), an operational flight program (OFP); and
couple the immersive VR environment with the virtual FMC to permit the immersive VR environment to interact with the virtual FMC using actual packed input/output (I/O) of the aircraft.

10. The method of claim 9, wherein the immersive VR environment and the virtual FMC are to be coupled via a protocol buffer.

11. The method of claim 9, further comprising:
simulating one or more line replaceable units (LRUs) that represent specialized hardware units used in an aircraft, wherein each of the LRUs is to be simulated via a different one of the one or more VMs.

12. The method of claim 11, wherein simulating the one or more LRUs is to permit other components of an aircraft to be virtualized to be used with the VR environment platform.

13. The method of claim 9, further comprising:
displaying a view of an immersive VR environment on a head mounted display (HMD).

14. The method of claim 9, further comprising:
receiving aircraft flight deck control inputs for the immersive VR environment through virtual interaction points.

15. The method of claim 9, further comprising:
providing physical feedback to a user of the VR environment platform through a physical interaction point simulating an aircraft control.

16. The method of claim 9, further comprising:
operating a flight simulator component interfacing with the immersive VR environment and the virtual FMC.

17. One or more computer storage devices having computer-executable instructions stored thereon for operating an immersive virtual reality (VR) environment platform, which, on execution by a computer, cause the computer to perform operations comprising:

provide an immersive VR environment of an aircraft;

run, via a virtual flight management computer (FMC), an operational flight program (OFP); and couple the immersive VR environment with the virtual FMC to permit the immersive VR environment to interact with the virtual FMC using actual packed input/output (I/O) of the aircraft.

18. The one or more computer storage devices of claim 17, wherein the immersive VR environment and the virtual FMC are to be coupled via a protocol buffer.

19. The one or more computer storage devices of claim 17, simulating one or more line replaceable units (LRUs) that represent specialized hardware units used in an aircraft, wherein each of the LRUs is to be simulated via a different one of the one or more VMs.

20. The one or more computer storage devices of claim 19, wherein simulating the one or more LRUs is to permit other components of an aircraft to be virtualized to be used with the VR environment platform.

\* \* \* \* \*